United States Patent [19]

Compton et al.

[11] Patent Number: 5,060,788
[45] Date of Patent: Oct. 29, 1991

[54] CHAIN GUIDE MOUNTING APPARATUS

[75] Inventors: Richard A. Compton, Pueblo; David M. Pruett, Canon City, both of Colo.

[73] Assignee: Portec, Inc., Oak Brook, Ill.

[21] Appl. No.: 501,150

[22] Filed: Mar. 28, 1990

[51] Int. Cl.⁵ .............................................. B65G 15/02
[52] U.S. Cl. .................................... 198/831; 198/838; 198/841
[58] Field of Search ......................... 198/831, 838, 841

[56] References Cited

U.S. PATENT DOCUMENTS

| | | | |
|---|---|---|---|
| 2,910,168 | 10/1959 | Shaw | 198/838 |
| 3,100,565 | 8/1963 | Fry | |
| 3,358,811 | 12/1967 | Gerrish | |
| 3,561,587 | 2/1971 | Schausten | |
| 4,128,166 | 12/1978 | Kovats | 198/838 |
| 4,202,443 | 5/1980 | Bührer | |
| 4,887,708 | 12/1989 | Brown et al. | |

OTHER PUBLICATIONS

Lord Industrial Products, Lord Flex-Bolt Sandwich Mounts.

Primary Examiner—Joseph E. Valenza
Attorney, Agent, or Firm—Klaas & Law

[57] ABSTRACT

Apparatus for supporting the guide members for guiding the moving endless chain for moving an endless belt conveyor, and in particular an endless conveyor for a power turn, mounted on a support frame wherein the guide members are mounted on a support member and at least one isolation member comprising a resilient sound and vibration deadening material is provided and the support member and support frame are secured together with the at least one isolation member located therebetween so as to isolate the support member from the support frame.

18 Claims, 7 Drawing Sheets

CHAIN GUIDE MOUNTING APPARATUS

FIELD OF THE INVENTION

This invention relates generally to apparatus for supporting guide means for guiding the endless chain for moving an endless conveyor belt and more particularly to isolation mounting means for mounting the guide means on the support frame of the apparatus to isolate the guide means from the support frame.

BACKGROUND OF THE INVENTION

Many industrial processing operations require the use of endless conveyor belts to move products from one location to another location. It is conventional to use linearly extending endless conveyor belts and power turns wherein the direction of movement may be changed in any desired umber of degrees. In many instances, the endless conveyor belt is driven by an endless chain which passes on guide means. It is customary to mount the guide means directly on the support structure on which the endless conveyor belt and endless chain are mounted. The movement of the endless chain on the guide means, particularly in power turn apparatus, produces vibrational forces due to the radially inwardly directed forces on the endless chain. A structure of this nature is illustrated in U.S. Pat. No. 4,887,708 to Brown et al. which is incorporated herein by reference thereto. These vibrational forces are amplified by the support structure so as to create a noisy environment. Therefore, it is desirable to reduce the vibrational forces between the guide means and the support structure.

BRIEF DESCRIPTION OF THE INVENTION

This invention provides apparatus for supporting the guide means for guiding the movement of a movable endless chain for moving a movable endless conveyor belt wherein isolation mounting means are used to mount the guide means on the support means of the apparatus to isolate the guide means from the support means so that vibrations of the guide means generated by the endless chain moving on the guide means will not be transmitted to the support means.

In one preferred embodiment of the invention, there is provided a movable endless conveyor belt having opposite edge portions. At least one movable endless chain is secured to at least one of the side edges so that movement of the at least one movable endless chain moves the movable endless conveyor belt. Drive means are provided for moving the at least one movable endless chain. Guide means are provided for guiding the movement of the at least one movable endless chain. Support means are provided for supporting at least the movable endless conveyor belt, the at least one movable endless chain, the drive means and the guide means. The support means comprise inner and outer sidewalls with support beams extending therebetween and secured thereto and a slider bed for supporting the movable endless conveyor belt. A cover plate is mounted on the support means to cover the guide means and the at least one movable endless chain. Isolation mounting means are provided for mounting the guide means on the support means to isolate the guide means from the support means. The isolation mounting means comprise a first support member mounted on the support means, a second support member and mounting means for mounting the guide means on the second support member. At least one isolation member is provided. Securing means are provided for securing the first and second support members together with the at least one isolation member located between the first and second support members.

In another preferred embodiment of the invention, a movable endless conveyor belt having arcuate outer and inner edge portions is provided for a power turn of a conveyor system and wherein the outer edge portion has a radius greater than the radius of the inner edge portion. A movable endless chain is secured to the outer edge portion so that movement of the endless chain moves the movable endless conveyor belt. Drive means are provided for moving the movable endless conveyor belt. Guide means are provided for guiding the movement of the endless chain. Support means are provided for supporting at least the movable endless conveyor belt, the movable endless chain, the drive means and the guide means. The support means comprise arcuate inner and outer sidewalls with support beams extending therebetween and secured thereto and a slider bed for supporting the movable endless conveyor belt. Isolation mounting means are provided for mounting the guide means on the support means to isolate the guide means from the support means. The isolation mounting means comprise a first support member mounted on the support means, a second support member and mounting means for mounting the guide means on the second support member. At least one isolation member, comprising a resilient sound absorbing material is provided. Securing means are provided for securing the first and second support members together with the at least one isolation member located between the first and second support members. In this preferred embodiment, the movable endless conveyor belt has an upper and lower run, the movable endless chain has an upper and lower run, the guide means comprise an upper guide member and a lower guide member, and the at least one isolation member comprises an upper isolation member and a lower isolation member. During the movement of the movable endless conveyor belt, greater radially inwardly directed forces are applied to the upper guide member than to the lower guide member so that compression forces are applied to the upper isolation member and tension forces are applied to the lower isolation member.

In another preferred embodiment of the invention, the isolation mounting means comprise a first support member mounted on the support means at a first location, a second support member having opposite surfaces and mounting means for mounting the upper and lower guide members on the second support member. An upper isolation member is provided. First securing means are provided for securing the first and second support members together with the upper isolation member located between said first support member and one of the opposite surfaces of the second support member. A lower isolation member is provided. Second securing means are provided for securing the second support member to the support means at a second location with the lower isolation member located between the other of the opposite surfaces and the support means. During the movement of the movable endless conveyor belt, greater radially inwardly directed forces are applied to the upper guide member than to the lower guide member so that compression forces are applied to the upper and lower isolation members.

In another preferred embodiment, the isolation mounting means comprise a first support member mounted on a sidewall of the support means and a second support member having upper and lower end portions on which the upper and lower guide members are mounted. At least one isolation member is provided. Securing means are provided for securing the support member on the first support member so that the isolation member is located between the first support member and the second support member.

In another preferred embodiment, the isolation mounting means comprise a support plate secured to the outer sidewall and covering an opening formed in the outer sidewall except for an opening in the support plate. A support member has upper and lower end portions on which are mounted the upper and lower guide members. A first isolation member having a central passageway, a reinforcing member having a central passageway, a second isolation member having a central passageway and a clamping washer having a central passageway are provided. Securing means are provided for securing the support member on the support plate so that the first isolation member is located between the support member and the support plate, the second isolation member is located between the reinforcing member and the clamping member and the reinforcing member is located between the second isolation member and the support plate.

In another preferred embodiment, the isolation mounting means comprise a support member having upper and lower end portions on which are mounted the upper and lower guide members. At least one isolation member is provided. Securing means are provided for securing the support member on the outer sidewall of the support means so that the upper and lower isolation members are located between the support member and the outer sidewall.

In another preferred embodiment, the isolation mounting means comprise first isolation mounting means for mounting the upper guide member on the support means at a first location to isolate the upper guide member from the support means and second isolation mounting means for mounting the lower guide member on the support means at a second location to isolate the lower guide member from the support means. Each of the first and second isolation mounting means comprises a first support member mounted on the support means, a second support member and mounting means for mounting either the upper guide member or the lower guide member on the second support member. At least one isolation member is provided. Securing means are provided for securing the first and second support members together with the at least one isolation member between the first and second support members.

A cover for the movable endless chain, which may be used with any of the preferred embodiment, is provided and has a first portion concentric to and spaced from the outer sidewall of the support means and a second portion extending radially inwardly from the first portion. The cover is mounted on the outer sidewall so that the second portion covers the movable endless chain. Noise abatement means are located between the first portion and the outer sidewall and between the second portion and the movable endless chain.

BRIEF DESCRIPTION OF THE DRAWINGS

An illustrative and presently preferred embodiment of the invention is shown in the accompanying drawings in which.

DETAILED DESCRIPTION OF THE INVENTION

Figure 1:
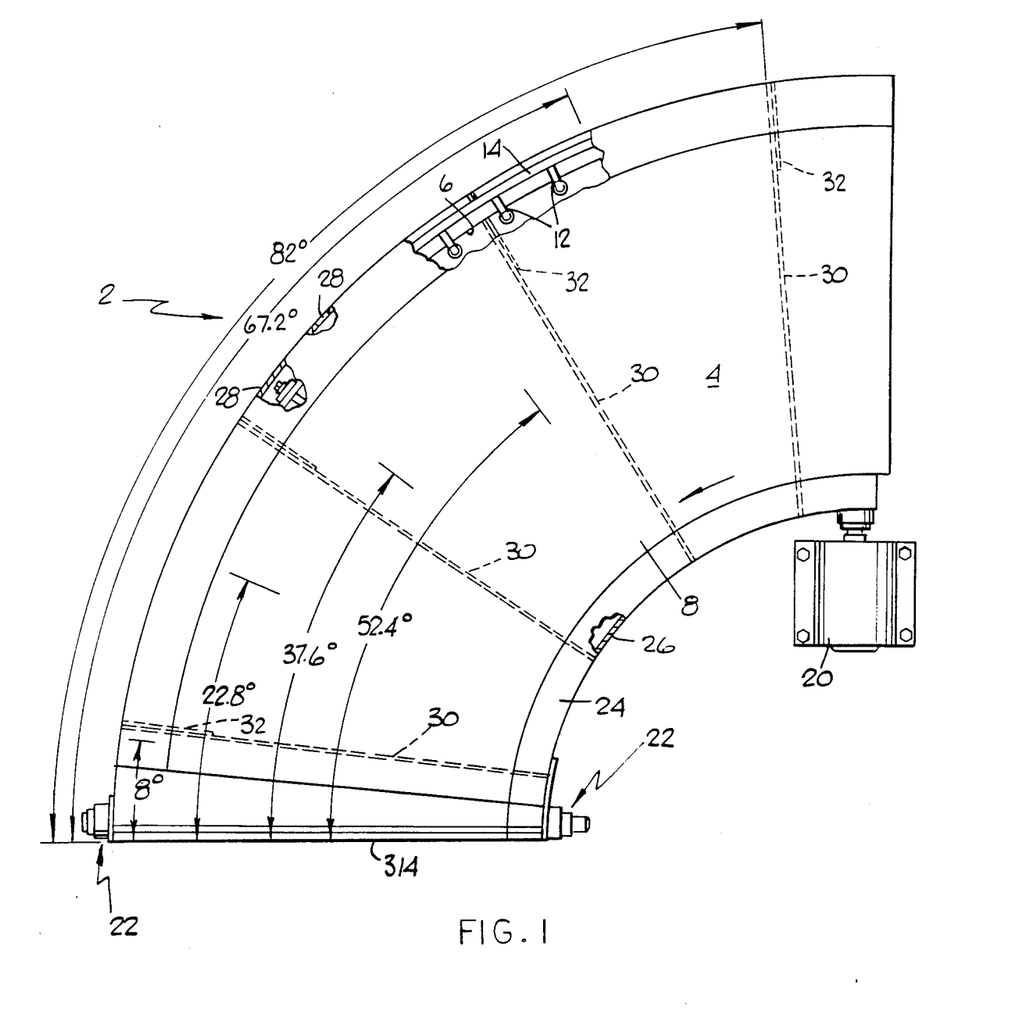
FIG. 1 is a top plan view of a power turn with parts removed.
Figure 2:
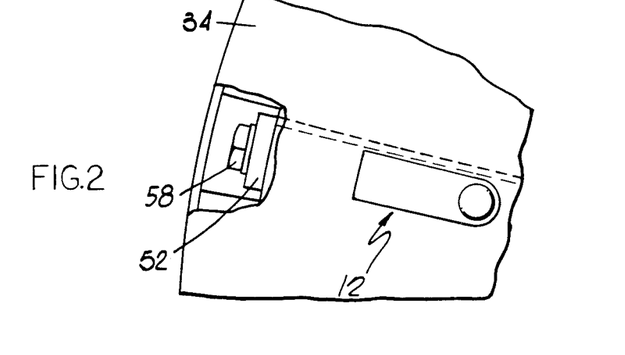
FIG. 2 is an enlarged portion of FIG. 1.

In FIG. 1, there is illustrated a power turn 2, such as that illustrated in the Brown et al. patent. While the power turn 2 is illustrated as being a 90 degree power turn, it is understood that it can be of any desired number of degrees. A movable endless conveyor belt 4 having an outer edge portion 6 and an inner edge portion 8 with the outer edge portion 6 having a radius greater than the radius of the inner edge portion 8. The outer edge portion 6 is attached to a movable endless chain 10, FIG. 3, by attachment means 12. The movable endless chain 10 moves through upper and lower guide members 14 and 16 which are formed from a suitable plastic material, such as ultra high molecular weigh polymers, nylon or wood or other materials having similar characteristics. The movable endless chain 10 is driven by gear means 18 driven by a motor 20. Idler gear means 22 are provided and are adjustably mounted to control the tension in the movable endless chain 10 and the movable endless conveyor belt 4. Support means are provided for supporting the movable endless conveyor belt 4 and comprise a slider bed 24 which is supported on the inner and outer sidewalls 26 and 28, a plurality of support beams 30 which extend between and are secured to the inner and outer sidewalls 26 and 28 by suitable means, such as by welding, and a plurality of gussets 32 which are secured to the outer sidewall 28 and the slider bed 24 by suitable means, such as by welding. A cover 34 is mounted on the outer sidewall. A brush 36 is mounted on the cover 34 by a support member 38 and is in contact with the movable endless conveyor belt 4 to prevent undesirable materials from entering under the cover 34 and also prevents the snaring of tags or loose items on articles being transported on the movable endless conveyor belt 4 and to prevent excessive noise from exiting between cover 34 and movable endless conveyor belt 4.

Figure 3:
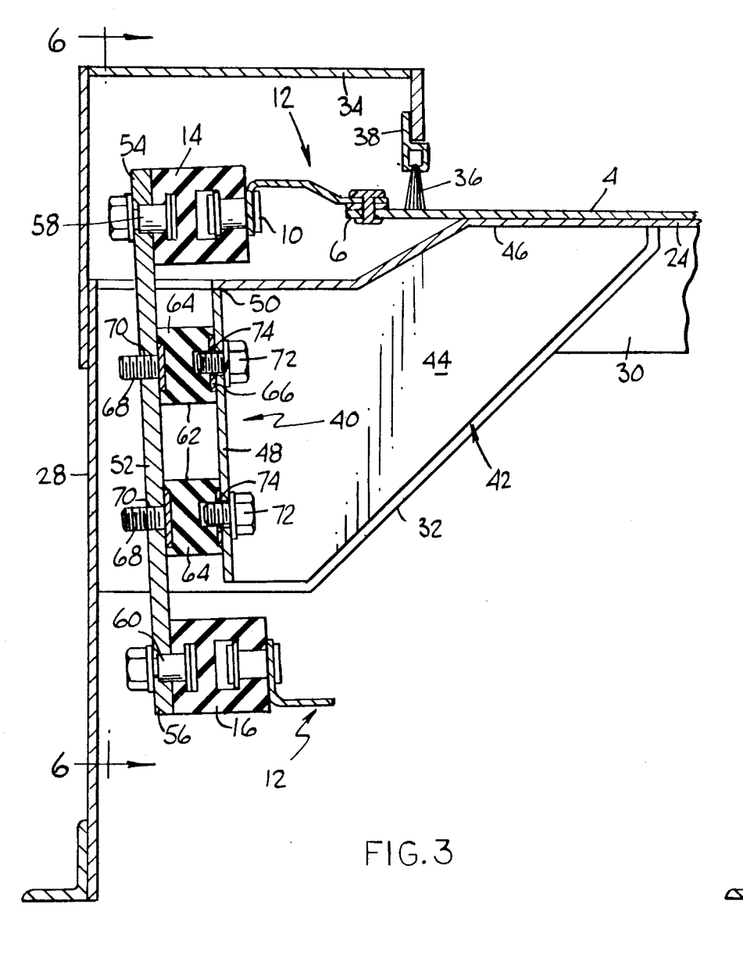
FIG. 3 is a view with parts in cross-section illustrating one preferred embodiment.
Figure 5:
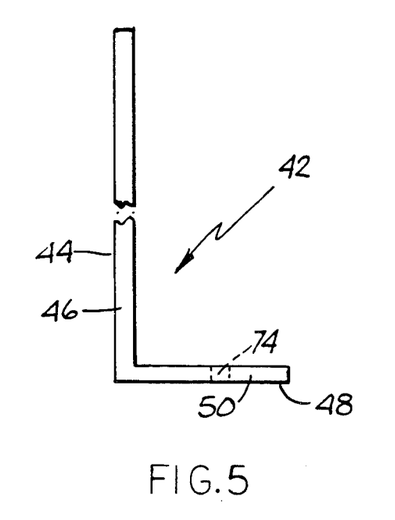
FIG. 5 is a top plan view of a support member.
Figure 6:
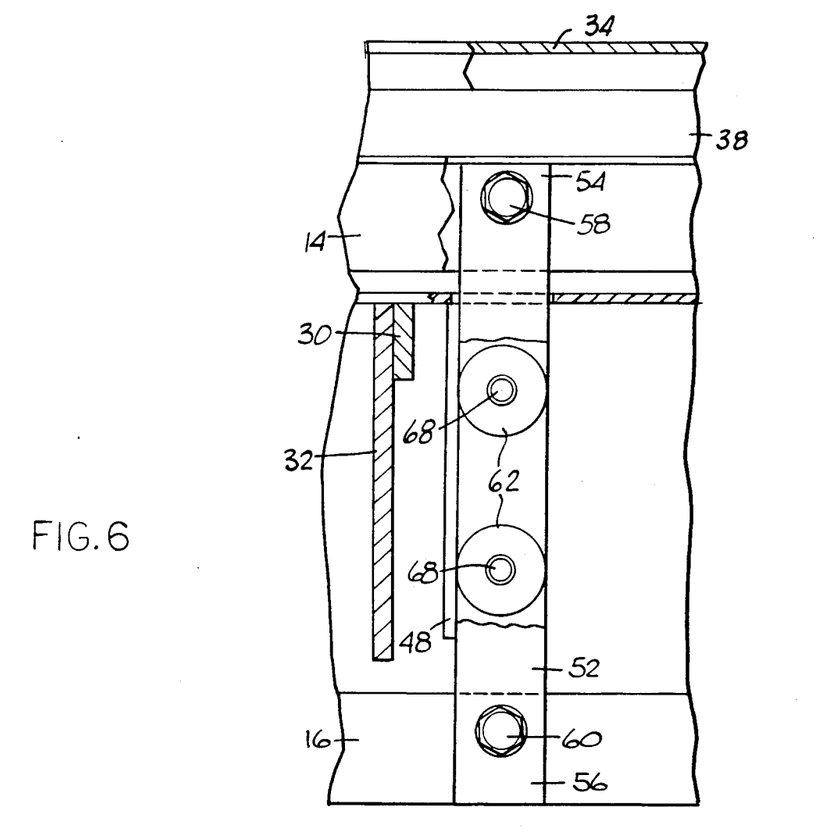
FIG. 6 is a cross-sectional view taken on the line 6—6 of FIG. 3.

A preferred embodiment of the invention is illustrated in FIGS. 3, 5 and 6 and comprises isolation mounting means 40 to isolate the upper and lower guide members 14 and 16 from the support means. A first support member 42 comprises a base portion 44 having an upper edge portion 46 which is secured to the slider bed 24 by suitable means, such as by welding. An integral flange portion 48 projects outwardly from the base portion 44 and has an upper edge portion 50 which is secured to the slider bed 24 by suitable means, such as by welding. A second support member 52 has an upper end portion 54 and a lower end portion 56. Mounting means 58 are provided for mounting the upper guide member 14 on the upper end portion 54 and mounting means 60 are provided for mounting the lower guide member 16 on the lower end portion 56. Upper and lower isolation sandwich mounts 62, such as that marketed by Lord Industrial Products under the trade designation J-4624-545, are used to mount the second support member 52 on the flange portion 48 of the first support member 42. Each isolation sandwich mount 62 comprises a main body portion 64 molded from an elastomer, such as polysulfide or polyurethane or other materials having similar characteristics. An internally threaded member 66 is integrally molded in one end of the main body portion 64 and an externally threaded member 68 is integrally molded in the other end of the main body portion. Each isolation sandwich mount 62 is secured on the second support member 52 by a threaded engagement between the externally threaded member 68 and an internally threaded opening 70 in the second support member 52. Each isolation sandwich mount 62 is secured on the flange portion 48 of the first support member 42 by headed threaded bolts 72 passing through openings 74 in the first support member 48 and in threaded engagement with the internally threaded member 66. Therefore, the second support member 52 is isolated from the first support member 40 and the support means. In the normal operation of a power turn, the movement of the movable endless conveyor belt results in greater radially inward directed forces being applied to the upper guide member 14, then to the lower guide member 16 so that, when in use in this arrangement, the upper isolation sandwich mount 62 is under compression and the lower isolation sandwich mount 62 is under tension. It is understood that, for each power turn 2, there will be a plurality of isolation mounting means 40 arcuately spaced apart. In a 90 degree power turn illustrated in FIG. 1, four to six isolation mounting means 40 would be used.

Figure 4:
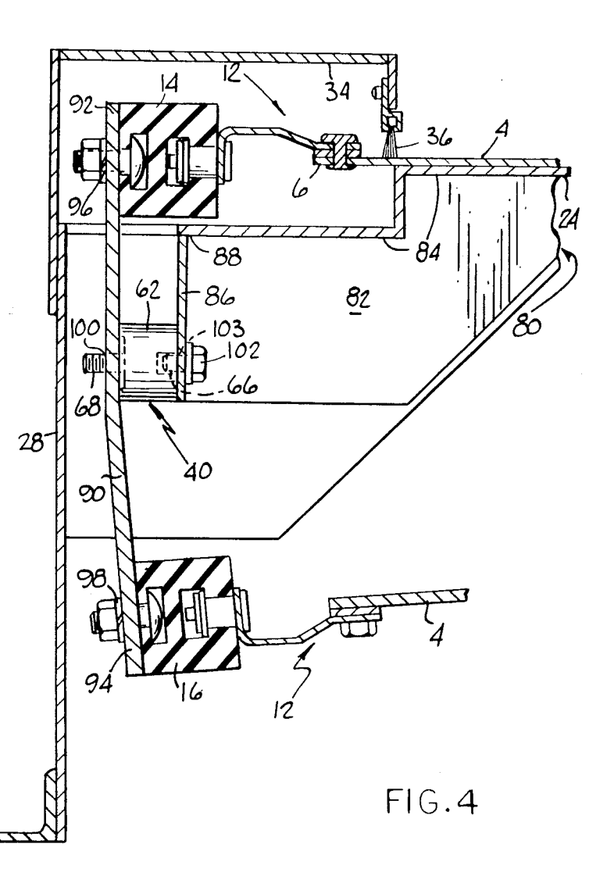
FIG. 4 is a view similar to FIG. 3 and illustrating another preferred embodiment.

Another preferred embodiment of the invention is illustrated in FIG. 4 and comprises isolation mounting means 40 to isolate the upper and lower guide members 14 and 16 from the support means. A first support member 80 comprises a base portion 82 having an upper edge portion 84 which is secured to the slider bed 24 by suitable means, such as by welding. An integral flange portion 86 projects outwardly from the base portion 82 and has an upper edge portion 88 which is secured to the slider bed 24 by suitable means, such as by welding. A second support member 90 has an upper end portion 92 and a lower end portion 94. Mounting means 96 are provided for mounting the upper guide member 14 on the upper end portion 92 and mounting means 98 are provided for mounting the lower guide member 16 on the lower end portion 94. An isolation sandwich mount 62 is used to mount the second support member 90 o the flange portion 86 of the first support member 80. The isolation sandwich mount 62 is secured on the second support member 90 by a threaded engagement between the externally threaded member 68 and an internally threaded opening 100 in the second support member 90. The isolation sandwich mount 62 is secured on the flange portion 86 of the first support member 80 by a headed threaded bolt 102 passing through an opening 103 in the first support member 80 and in threaded engagement with the flange portion 86 of the internally threaded member 66. Therefore, the second support member 90 is isolated from the first support member 80 and the support means. When in use in this arrangement, half of the isolation sandwich mount 62 is under compression and the other half is under tension.

Figure 7:
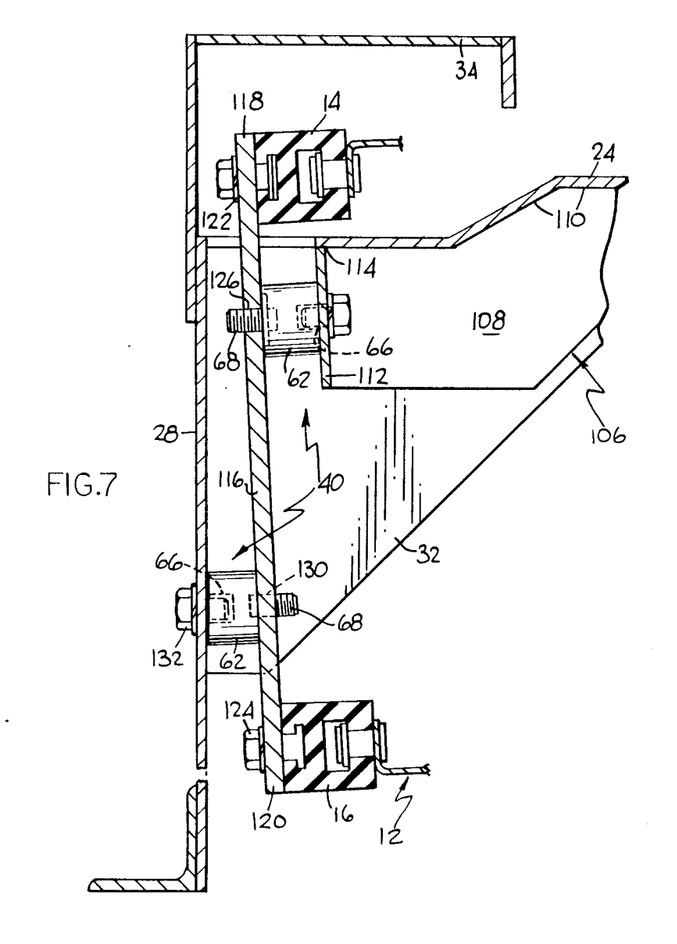
FIGS. 7-12 are views similar to FIG. 3 and illustrating other preferred embodiments.

Another preferred embodiment of the invention is illustrated in FIG. 7 and comprises isolation mounting means 40 to isolate the upper and lower guide members 14 and 16 from the support means. A first support member 106 comprises a base portion 108 having an upper edge portion 110 which is secured to the slider bed 24 by suitable means, such as by welding. An integral flange portion 112 projects outwardly from the base portion 108 and has an upper edge portion 114 which is secured to the slider bed 24 by suitable means, such as by welding. A second support member 116 has an upper end portion 118 and a lower end portion 120. Mounting means 122 are provided for mounting the upper guide member 14 on the upper end portion 118 and mounting means 124 are provided for mounting the lower guide member 16 on the lower end portion 120. An upper isolation sandwich mount 62 is used to mount the second support member 116 on the flange portion 112 of the first support member 106. The upper isolation sandwich mount 62 is secured on the second support member 116 by a threaded engagement between the externally threaded member 68 and an internally threaded opening 126 in the second support member 116 and to the flange portion 112 by a headed threaded bolt 128 threaded into the internally threaded member 66. A lower isolation sandwich mount 62 is used to mount the second support member 116 on the sidewall 28. The lower isolation sandwich mount is secured on the second support member 116 by a threaded engagement between the externally threaded member 68 and an internally threaded opening 130 in the second support member 116 and to the sidewall 28 by a headed threaded bolt 132 in threaded engagement with the internally threaded member 66. Therefore, the second support member 116 is isolated from the sidewall 28 and the first support member 106. When in use in this arrangement, the upper and lower isolation sandwich mounts 62 are each under compression.

Figure 8:
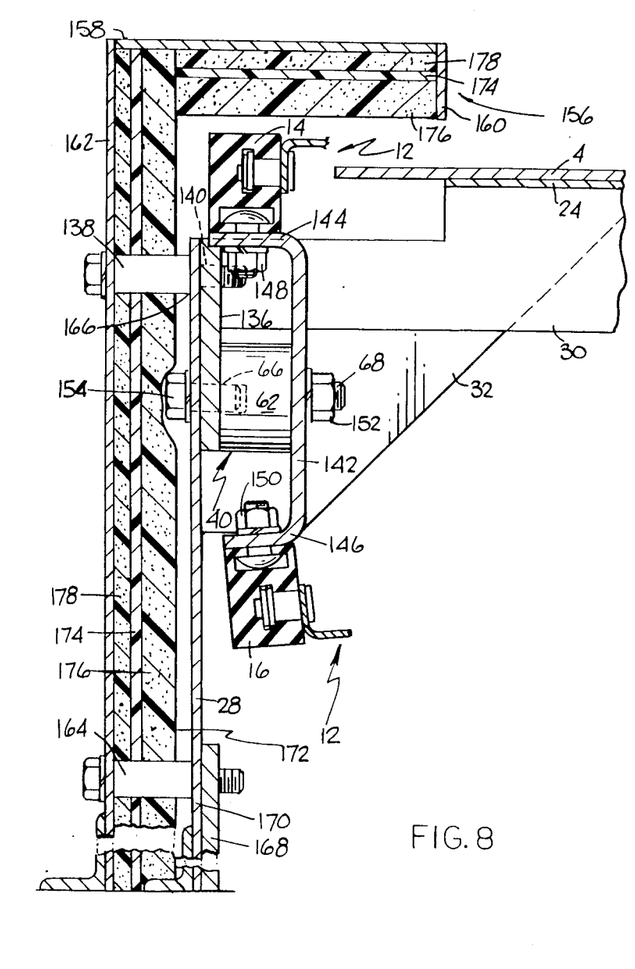

Another preferred embodiment of the invention is illustrated in FIG. 8 and comprises isolation mounting means 40 to isolate the upper and lower guide members 14 and 16 from the support means. A first support member 136 is secured to the sidewall 28 by suitable means, such as by welding. A second support member 142 has an upper end portion 144 and a lower end portion 146. Mounting means 148 are provided for mounting the upper guide member 14 on the upper end portion 144 and mounting means 150 are provided for mounting the lower guide member 16 on the lower end portion 146. The isolation sandwich mount 62 is secured on the second support member 142 by the externally threaded member 68 passing through an opening (not shown) in the second support member 142 and a washer and nut 152 threaded thereon. The isolation sandwich mount 62 is secured on the first support member 136 by a headed threaded bolt 154 passing through the sidewall 28 and in threaded engagement with the internally threaded member 66. Therefore, the second support member 142 is isolated from the first support member 136 and the support means. When in use in this arrangement, half of the isolation sandwich mount 62 is under compression and the other half is under tension.

Cover means 156 are also provided in FIG. 8 and comprise a top wall portion 158 having a downwardly extending flange portion 160 and a sidewall portion 162 which is secured to the sidewall 28 by the headed threaded bolts 138 and 164. The headed threaded bolt 138 has a shoulder 166 that abuts against the sidewall 28. The headed threaded bolt 164 is threaded into a support plate 168 and has a shoulder 170 that abuts against the sidewall 28. Noise insulating material 172 comprising a composite of a plastic barrier sheet 174 or a lead sheet sandwiched between layers 176 and 178 of foam insulation, such as foamed polyurethane or other similar materials is provided. The layer 178 is secured to the inner surfaces of the sidewall portion 162 and the top wall portion 158 by suitable means, such as an adhesive. The insulating material functions to dampen noises generated by the moving endless conveyor belt 4.

Figure 9:
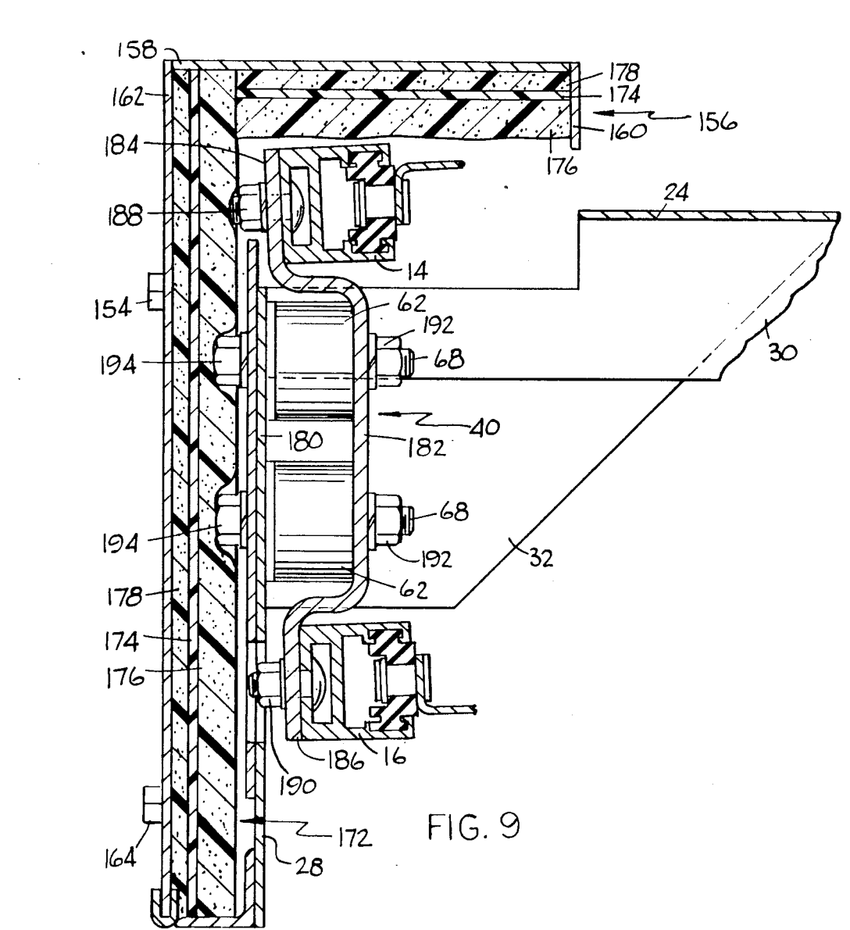

Another preferred embodiment of the invention is illustrated in FIG. 9 and comprises isolation mounting means 40 to isolate the upper and lower guide members 14 and 16 from the support means. A first support member 180 is secured to the sidewall 28 by suitable means, such as by welding. A second support member 182 has an upper end portion 184 and a lower end portion 186. Mounting means 188 are provided for mounting the upper guide member 14 on the upper end portion 184 and mounting means 190 are provided for mounting the lower guide member 16 on the lower end portion 186. Upper and lower isolation sandwich mounts 62 are secured to the second support member 182 by passing the externally threaded members 68 through openings (not shown) in the second support member 182 and using nuts and washers 192 to secure them to the second support member 182. The upper and lower isolation sandwich mounts 62 are secured to the first support member 180 by headed threaded bolts 194 secured to the internally threaded members 66 (not shown). Therefore, the second support member 182 is isolated from the first support member 180 and the support means. When in use in this arrangement, the major portion of the upper isolation sandwich mount 62 is under tension and the major portion of the lower isolation sandwich mount 62 is under compression. Cover means 156 and insulation material 172 similar to that in FIG. 8 are also provided.

Figure 10:
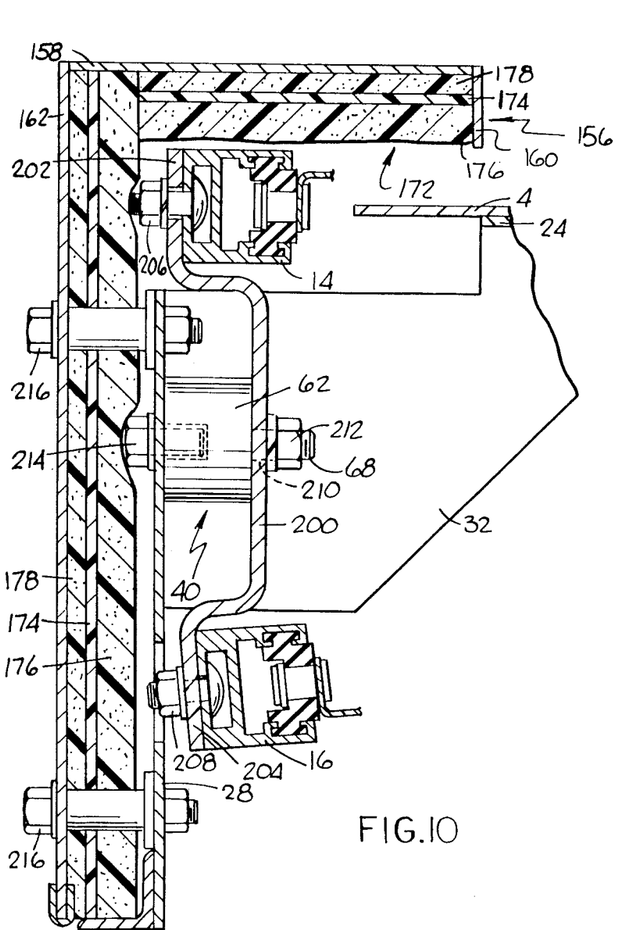

Another preferred embodiment of the invention is illustrated in FIG. 10 and comprises isolation mounting means 40 to isolate the upper and lower guide members 14 and 16 from the support means. A support member 200 has an upper end portion 202 and a lower end portion 204. Mounting means 206 are provided for mounting the upper guide member 14 on the upper end portion 202 and mounting means 208 are provided for mounting the lower guide member 16 on the lower end portion 204. An isolation sandwich mount 62 is used to mount the support member 200 on the sidewall 28. The isolation sandwich mount 62 is secured to the support member 200 by passing the externally threaded member 68 through an opening 210 in the support member 200 and using a nut and washer 212 to secure it to the support member 200. The isolation sandwich mount 62 is secured to the sidewall 28 by a headed threaded bolt 214 secured to an internally threaded member 66 (not shown). Therefore, the second support member 200 is isolated from the sidewall 28. When in use in this arrangement, half of the isolation sandwich members is under tension and the other half is under compression. Cover means 156 secured to the sidewall 28 by nuts and bolts 216 and insulating material 172 similar to that in FIG. 8 are also provided.

Figure 11:
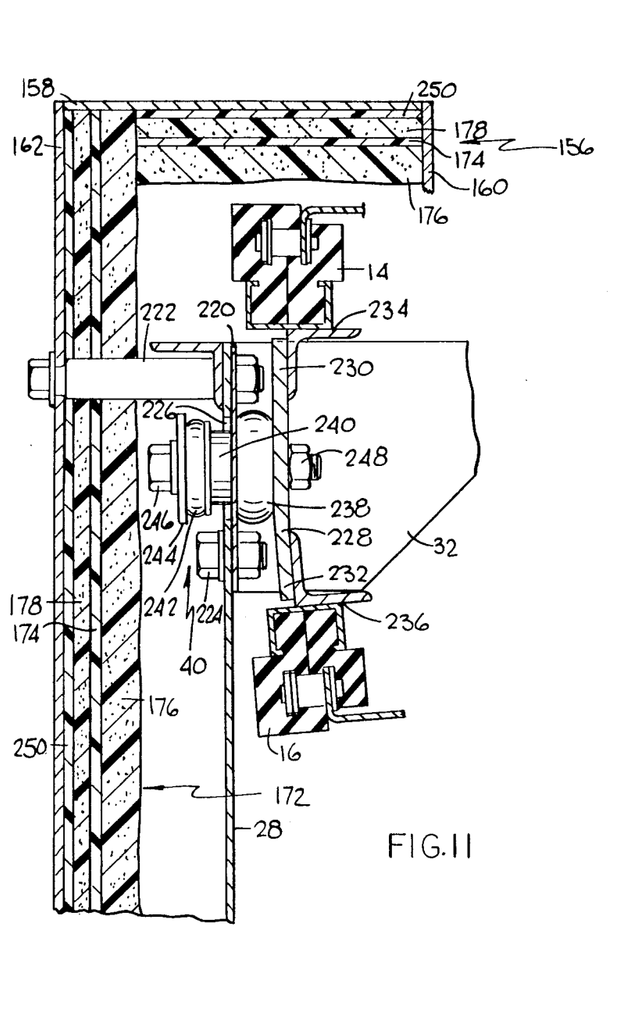

Another preferred embodiment of the invention is illustrated in FIG. 11 and comprises isolation mounting means 40 to isolate the upper and lower guide members 14 and 16 from the support means. A first support member 220 is secured to the sidewall 28 by nuts and bolts 222 and 224 and covers an opening 226 in the sidewall 28. A second support member 228 has an upper end portion 230 and a lower end portion 232 Mounting means 234 are provided for mounting the upper guide member 14 on the upper end portion 230 and mounting means 236 are provided for mounting the lower guide means 16 on the lower end portion 232. The isolation mounting means 40 comprise a first annular resilient isolation member 238 having a central opening (not shown), an opening (not shown) in the first support member 220, an annular metallic reinforcing member 240 having a central opening (not shown), a second annular resilient isolation member 242 having a central opening (not shown) and an annular metallic washer 244 having a central opening (not shown). A headed threaded bolt 246 passes through the openings in the annular metallic washer 244, the second annular resilient isolation member 242, the annular metallic reinforcing member 240, the first support member 220 and the first annular resilient isolation member 238 and a nut 248 bearing against the second support member 228 is tightened to secure the second support member 228 on the first support member 220 with the first annular resilient isolation member 208 squeezed therebetween. The first and second annular resilient isolation members 238 and 242 function to isolate the second support member 228 from the first support member 220. Cover means 156 secured to the sidewall 28 by nuts and bolts 222 and insulating material 172 similar to that in FIG. 8 are provided. An additional plastic sheet 250 is added to the insulating material 172 and is secured to the inner surfaces of the top wall portion 158 and the sidewall portion 162 by suitable means, such as an adhesive.

Figure 12:
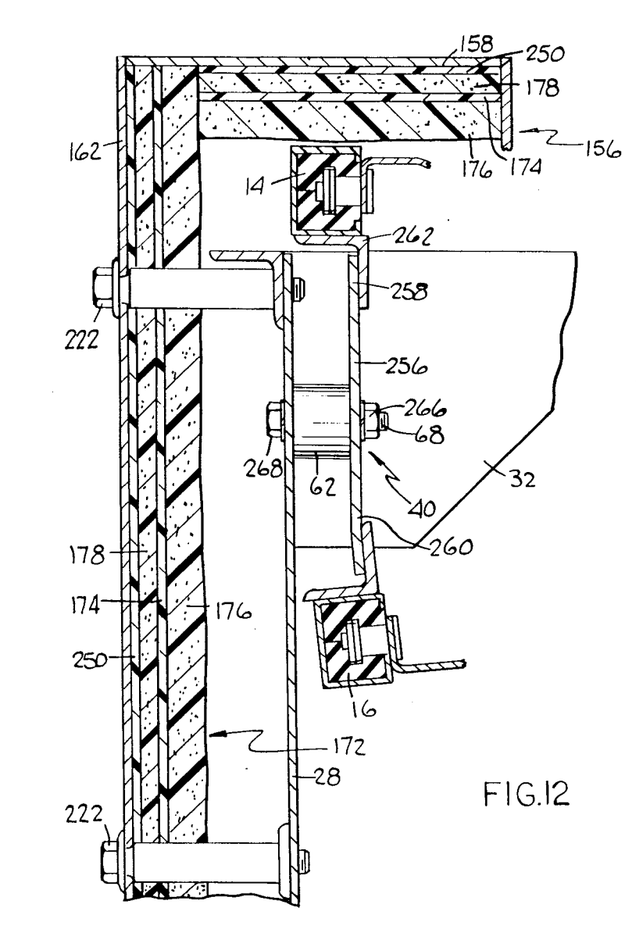

Another preferred embodiment of the invention is illustrated in FIG. 12 and comprises isolation mounting means 40 to isolate the upper and lower guide members 14 and 16 from the support means. A support member 256 has an upper end portion 258 and a lower end portion 260. Mounting means 262 are provided for mounting the upper guide member 14 on the upper end portion 258 and mounting means 264 are provided for mounting the lower guide member 16 on the lower end portion 258. An isolation sandwich mount 62 is used to mount the support member 256 on the sidewall 28. The isolation sandwich mount 62 is secured to the support member 256 by passing an externally threaded member 68 through an opening (not shown) in the support member 256 and using a nut and washer 266 to secure it to the support member 256. The isolation sandwich mount 62 is secured to the sidewall 28 by a headed threaded bolt 268 secured to an internally threaded member 66 (not shown). Therefore, the support member 256 is isolated from the sidewall 28. When in use in this arrangement, half of the isolation sandwich mount 62 is in tension and the other half is in compression. Cover means 156 and noise insulating material 172 similar to that in FIG. 11 are provided.

Figure 13:
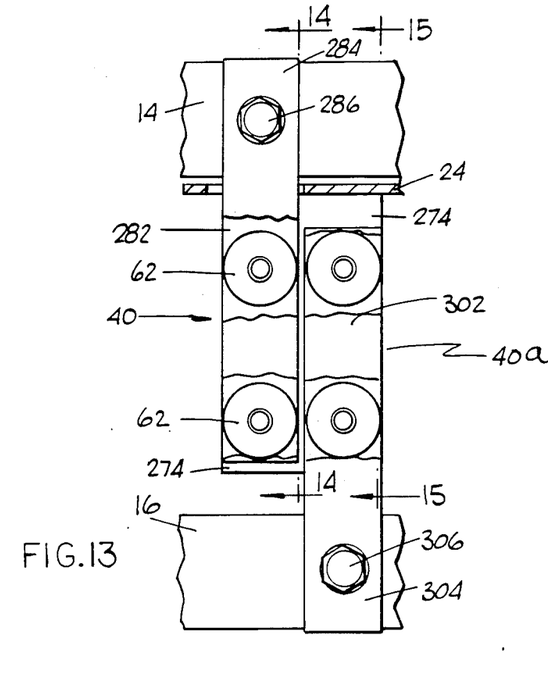
FIG. 13 is a view similar to FIG. 6 and illustrating another preferred embodiment.
Figure 14:
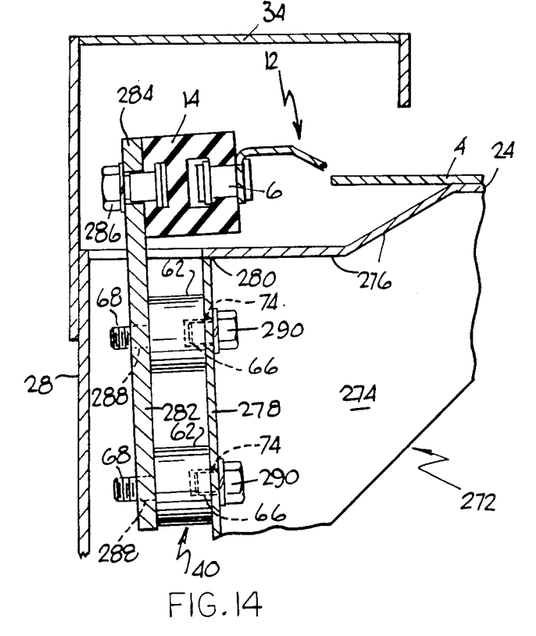
FIG. 14 is a view with parts in section looking from the right of FIG. 13.
Figure 15:
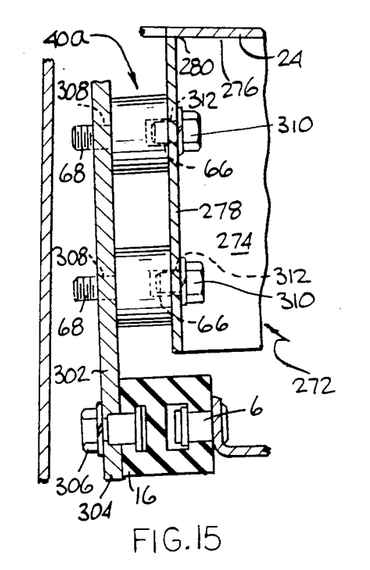
FIG. 15 is a view with parts in section looking from the right of FIG. 13.

Another preferred embodiment of the invention is illustrated in FIGS. 13–15 and comprises isolation mounting means 40 to isolate the upper guide member 14 from the support means and isolation mounting means 40a to isolate the lower guide member 16 from the support means. A first support member 272 comprises a base portion 274 having an upper edge portion 276 which is secured to the slider bed 24 by suitable means, such as by welding. An integral flange portion 278 projects outwardly from the base portion 274 and has an upper edge portion 280 which is secured to the slider bed 24 by suitable means, such as by welding. A second support member 282 has an upper end portion 284. Mounting means 286 are provided for mounting the upper guide member 14 on the upper end portion 284. Upper and lower isolation sandwich mounts 62 are used to mount the second support member 282 on the flange portion 278. Each isolation sandwich mount 62 is secured on the second support member 282 by a threaded engagement between the externally threaded member 68 and an internally threaded opening 288 in the second support member 282. Each isolation sandwich mount 62 is secured on the flange portion 278 of the first support member 272 by headed threaded bolts 290 passing through openings 74 in the first support member 48 and in threaded engagement with the internally threaded member 66. Therefore, the second support member 282 is isolated from the flange portion 278 of the first support member 272 and the support means. When in use in this arrangement, the major portion of the upper isolation sandwich mounts 62 is under compression and the major portion of the lower isolation sandwich mount 62 is under tension.

The isolation mounting means 40a comprise the first support member 272 having a base portion 274 having an upper edge portion 276 which is secured to the slider bed 24 by suitable means, such as by welding. An integral flange portion 278 projects outwardly from the base portion 274 and has an upper edge portion 280 which is secured to the slider bed 24 by suitable means, such as by welding. A second support member 302 has a lower end portion 304. Mounting means 306 are provided for mounting the lower guide member 16 on the lower end portion 304. Upper and lower isolation sandwich mounts 62 are used to mount the second support member 302 on the flange portion 278. Each isolation sandwich mount 62 is secured on the second support member 302 by a threaded engagement between the externally threaded member 68 and an internally threaded opening 308 in the second support member 302. Each isolation sandwich mount 62 is secured on the flange portion 278 of the first support member 272 by headed threaded bolts 310 passing through openings 312 in the first support member 278 and in threaded engagement with the internally threaded member 66. Therefore, the second support member 302 is isolated from the first support member 272 and the support means. When in use in this arrangement, the major portion of the upper isolation sandwich mount 62 is under tension and the major portion of the lower isolation sandwich mount 62 is under compression.

The number of isolation mounting means 40 employed in a power turn will depend upon the number of degrees in the power turn and the width of the movable endless conveyor belt 4. As illustrated in FIG. 1, in a power turn of 90 degrees and an exposed movable endless conveyor belt width of about 30 inches, six isolation mounting means 40 are used at spaced apart intervals, as illustrated in FIG. 1, of 8, 2.8, 37.6, 52.4, 67.2 and 82 degrees from the exit end 314 of the power turn. The six isolation mounting means 40 may be all of the same type, such as the embodiment of FIG. 3, or they can be mixed from the embodiments of FIGS. 3, 4, 7, 8, 9, 10, 11, 12 and 13. Generally, the power turns will vary in width between about 12 and 48 inches and the number of isolation mounting means will be about 4-12. Also, although the isolation mounting means 40 are described in relation to a power turn, they also may be used with linearly extending, movable endless conveyor belts.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. Apparatus for supporting the guide means for guiding a moving endless chain for moving an endless conveyor belt comprising:

a movable endless conveyor belt having opposite side edge portions, an upper run and a lower run;

at least one movable endless chain having an upper run and a lower run and secured to at least one of said side edge portions so that movement of said at least one movable endless chain moves said movable endless conveyor belt;

drive means for moving said at least one movable endless chain;

first support means for supporting at least said movable endless conveyor belt, said at least one movable endless chain and said drive means;

upper and lower guide means for guiding the movement of said at least one movable endless chain;

second support means for supporting said upper and lower guide means; and isolation mounting means for mounting said second support means on said first support means to isolate said upper and lower guide means from said first support means.

2. Apparatus as in claim 1 wherein said isolation mounting means comprise:

mounting means for mounting said upper and lower guide means on said second support means;

at least one isolation member; and securing means for securing said first and second support means together with said at least one isolation member located between said first and second support means.

3. Apparatus as in claim 2 wherein said isolation member comprises:

a resilient sound and vibration deadening material.

4. Apparatus as in claim 1 wherein said isolation mounting means comprise:

a first support member mounted on said first support means;

a second support member;

mounting means for mounting said upper and lower guide means on said second support member;

at least one isolation member; and securing means for securing said first and second support members together with said at least one isolation member located between said first and second support members.

5. Apparatus for supporting the guide means for guiding the endless chain for moving an endless conveyor belt for a power turn comprising:

a movable endless conveyor belt having arcuate outer and inner edge portions and wherein said outer edge portion has a radius greater than the radius of said inner edge portion and having an upper run and a lower run;

a movable endless chain having an upper run and a lower run and secured to said outer edge portion so that movement of said movable endless chain moves said movable endless conveyor belt;

drive means for moving said movable endless chain;

first support means for supporting at least said movable endless conveyor belt, said movable endless chain and said drive means;

said support means having arcuate inner and outer sidewalls;

upper and lower guide means for guiding the movement of said movable endless chain;

second support means for support said upper and lower guide means;

isolation mounting means for mounting said said second support means on said first support means to isolate said guide means from said first support means.

6. Apparatus as in claim 5 wherein said isolation mounting means comprise:

mounting means for mounting said upper and lower guide means on said second support means;

at least one isolation member; and securing means for securing said first and second support means together with said at least one isolation member located between said first and second support means.

7. Apparatus as in claim 6 wherein said isolation member comprises:

a resilient sound and vibration deadening material.

8. Apparatus as in claim 6 and further comprising:

said movable endless conveyor belt applying radially inwardly directed forces on said upper and lower runs of said movable endless chain; and said radially inwardly directed forces applying compression and tension forces on said at least one isolation member.

9. Apparatus as in claim 5 wherein said isolation mounting means comprise:

a first support member mounted on said first support means;

a second support member;

mounting means for mounting said upper guide means and said lower guide member on said second support member;

at least a pair of isolation members; and securing means for securing said first and second support members together with said at least a pair of isolation members located between said first and second support members at spaced apart locations.

10. Apparatus as in claim 9 and further comprising:

said movable endless conveyor belt applying radially inwardly directed forces on said upper and lower runs of said movable endless chain; and said radially inwardly directed forces applying compression forces on one of said at least a pair of isolation members and tension forces on the other of said at least a pair of isolation members.

11. Apparatus as in claim 5 wherein said isolation mounting means comprise:

a first support member mounted on said first support means at a first location;

a second support member having opposite surfaces;

mounting means for mounting said upper guide means and said lower guide means on said second support member;

an upper isolation member;

first securing means for securing said first and second support members together with said upper isolation member located between said first support member and one of said opposite surfaces of said second support member;

a lower isolation member; and second securing means for securing said second support member to said first support means at a second location with said lower isolation member located between the other of said opposite surfaces and said first support means.

12. Apparatus as in claim 11 and further comprising:

said movable endless conveyor belt applying radially inwardly directed forces on said upper and lower runs of said movable endless chain; and said radially inwardly directed forces applying compression forces on said upper and lower isolation members.

13. Apparatus as in claim 5 wherein said isolation mounting means comprise:

a support member having upper and lower end portions;

first mounting means for mounting said upper guide means on said upper end portion;

second mounting means for mounting said lower guide means on said lower end portion;

at least one isolation member; and securing means for securing said support member on said first support means so that said at least one isolation member is located between said support member and said first support means.

14. Apparatus as in claim 5 and further comprising:

said first support means including an outer sidewall;

a chain cover having a first portion concentric to and spaced from said outer sidewall and a second portion extending radially inwardly from said first portion;

mounting means for mounting said chain cover on said outer sidewall so that said second portion covers said upper run of said movable endless chain; and noise abatement material located at least between said first portion and said outer sidewall.

15. Apparatus as in claim 14 wherein said isolation mounting means comprise:

said outer sidewall having an opening formed therein:

a support plate secured to said outer sidewall and covering said opening;

said support plate having an opening formed therein;

a support member having opposite upper and lower end portions;

first mounting means for mounting said upper guide means on said upper end portion;

second mounting means for mounting said lower guide means on said lower end portion;

a first isolation member having a central passageway extending therethrough;

a reinforcing member having opposite end surfaces and a central passageway extending therethrough and having an opening in each of said opposite end portions;

a second isolation member having a central passageway extending therethrough;

a clamping washer having a central passageway extending therethrough; and securing means for securing said support member on said support plate so that said first isolation member is located between said support member and said support plate, aid second isolation member is located between said clamping washer and one of said opposite end surfaces and the other of said opposite end surfaces is in contact with said support plate.

16. Apparatus as in claim 5 wherein said isolation mounting means comprise:

a support member having upper and lower end portions;

first mounting means for mounting said upper guide means on said upper end portion;

second mounting means for mounting said lower guide means on said lower end portion;

at least a pair of isolation members;

securing means for securing said support member on said first support means so that said at least a pair of isolation members are located between said support member and said first support means; and said at least a pair of isolation members comprising an upper isolation member and a lower isolation member.

17. Apparatus as in claim 5 wherein said second support means comprise:

first isolation mounting means for mounting said upper guide means on said first support means at a first location to isolate said upper guide member from said first support means; and second isolation mounting means for mounting said lower guide means on said first support means at a second location to isolate said lower guide member from said first support means.

18. Apparatus as in claim 17 wherein:

said first isolation means comprise:

a first support member mounted on said first support means at said first location;

a second support member;

mounting means for mounting said upper guide means on said second support member;

at least on isolation member; and securing means for securing said first and second support members together with said at least one isolation member between said first and second support members; and said second isolation mounting means comprise:

a third support member mounted on said first support means at said second location;

a fourth support member;

mounting means for mounting said lower guide means on said fourth support member;

at least another isolation member; and securing means for securing said third and fourth support members together with said at least another isolation member between said third and fourth support members.

* * * * *